United States Patent [19]
Gäng et al.

[11] Patent Number: 5,888,254
[45] Date of Patent: Mar. 30, 1999

[54] LEUCO VAT-DYE PREPARATIONS IN GRANULE FORM

[75] Inventors: Manfred Gäng, Bobenheim-Roxheim; Rudolf Krüger, Weisenheim; Peter Miederer, Hassloch; Harald Schlüter, Weisenheim; Peter Schultz, Bad Dürkheim; Manfred R. Wolf, Mannheim, all of Germany

[73] Assignee: BASF Aktiengesellschaft, Ludwigshafen, Germany

[21] Appl. No.: 875,404

[22] PCT Filed: Jan. 12, 1996

[86] PCT No.: PCT/EP96/00120
§ 371 Date: Jul. 31, 1997
§ 102(e) Date: Jul. 31, 1997

[87] PCT Pub. No.: WO96/23841
PCT Pub. Date: Aug. 8, 1996

[30] Foreign Application Priority Data

Jan. 31, 1995 [DE] Germany .......................... 19502968.2

[51] Int. Cl.$^6$ .............................. C09B 67/28; C09B 67/06; D06P 1/22
[52] U.S. Cl. ........................ 8/526; 8/653; 8/587; 8/918; 548/458
[58] Field of Search ................................ 8/653, 524, 525, 8/526, 527, 587; 548/458

[56] References Cited

U.S. PATENT DOCUMENTS 5,053,078  10/1991  Koike et al. .
5,637,116   6/1997  Gaeng et al. .

*Primary Examiner*—Margaret Einsmann
*Attorney, Agent, or Firm*—Oblon, Spivak, McClelland, Maier & Neustadt, P.C.

[57] ABSTRACT

Granular leuco vat-dye preparations containing, as essential components, leuco vat-dye, reducing agents and alkaline metal hydroxide, and the production of said preparations and their use in dyeing cellulose-containing textile materials.

11 Claims, No Drawings

LEUCO VAT-DYE PREPARATIONS IN GRANULE FORM

BACKGROUND OF THE INVENTION

1. Field of the Invention

The present invention relates to new leuco vat dye preparations in granule form, comprising as essential constituents leuco vat dye, reductant and alkali metal hydroxide.

The invention furthermore relates to the production of the leuco vat dye preparations and their use for dyeing cellulose-containing textile material.

Last but not least, the invention relates to a process for stabilizing dry hydrosulfite against self-ignition.

2. Description of the Background

Indigoid dyes (in particular indigo itself and its bromo derivatives such as brilliant indigo) and anthraquinoid dyes (in partiuclar nitroviolanthrone (C.I. Vat Green 9)) are vat dyes which have been known for a long time and which are employed for dyeing cellulose-containing textile materials.

For dyeing, the water-insoluble vat dye must first be converted by reduction (vatting) into the water-soluble fiber-reactive leuco form, which is then oxidized again to the water-insoluble vat dye pigment after absorption on the material to be dyed.

In the known dyeing processes, the vat dye is vatted in alkaline medium by addition of inorganic reductants such as hydrosulfite (sodium dithionite) and thiourea dioxide or alternatively organic reductants such as hydroxyacetone in a container placed in front of the dye bath. Additional machine-dependent amounts of reductant are used during dyeing, as a part of the leuco dye is oxidized by air contact in the air ducts and on the surface of the dye bath and must be vatted again, which is why reductant must be added to the dye bath.

A disadvantage in the vatting of vat dye using said reductants is the high pollution of the dyeing effluent by sulfate (about 3500 to 5000 mg/l, measured in the effluent of an indigo dyehouse) in the case of hydrosulfite or by oxygen-consuming substances (COD values of about 8000 mg of oxygen/l, measured in the effluent of an indigo dyehouse) in the case of hydroxyacetone.

In the case of indigo, powdered solid to pasty preparations of the leuco form are also described which, as stabilizers, contain polyhydroxy compounds, such as glycerol and in particular compounds derived from sugars, eg. molasses, mixed with alkali or zinc dust (DE Patents 200 914 and 235 047). GB Patent 276 023 furthermore discloses the preparation of powdered leuco dye preparations by heating a mixture of unreduced vat dye, glycol, alkali, hydrosulfite and sodium sulfate and drying in an open vessel and subsequent grinding.

In the case of the first-mentioned preparations, the sulfate content of the dyeing effluent can be lowered effectively, but as a rule these preparations are difficult to meter, as even the dry preparations tend to form lumps, and only dissolve slowly in the dye bath. In the last-mentioned case, the sulfate pollution is increased even further, as sulfate is additionally added to the preparations, which anyway already contain the sulfate produced by the reduction of the dye in the mixture described above.

WO-A-94/23114 discloses a dyeing process in which indigo is employed in prereduced form as an aqueous, alkaline solution obtained during catalytic hydrogenation. In this way, the effluent pollution by organic substances falls, and the sulfate pollution is reduced to the amount of hydrosulfite necessary as a result of air contact during the dyeing process. A disadvantage, however, is that the leucoindigo solution used is sensitive to oxidation and must be handled and stored with exclusion of oxygen. In addition, the high water ballast of this solution is a hindrance both during storage and during transport.

Finally, German Patent Application 43 27 221, which is not a prior publication, describes leucoindigo preparations in granule form, which contain leucoindigo and alkali metal hydroxide as essential components.

SUMMARY OF THE INVENTION

It is an object of the present invention to prepare leuco vat dye preparations which do not have the disadvantages mentioned and can be advantageously employed for dyeing.

We have now found that this object is achieved by leuco vat dye preparations in granule form, which as essential constituents contain leuco vat dye, reductant and alkali metal hydroxide.

We have additionally found a process for preparing these leuco vat dye preparations, which comprises concentrating an aqueous alkaline solution of the leuco vat dye and a solution or suspension of the reductant in water and/or a water-miscible solvent to dryness together with thorough mixing and with exclusion of oxygen.

Finally, we have found a process for dyeing cellulose-containing textile material, which comprises using for this the leuco vat dye preparations.

We have additionally found a process for stabilizing dry hydrosulfite against self-ignition, which comprises spray granulating an aqueous hydrosulfite solution together with a leuco vat dye solution with exclusion of oxygen in such a weight ratio that the resulting granules contain <50% by weight of hydrosulfite.

DETAILED DESCRIPTION OF THE INVENTION

The preparations according to the invention as a rule contain from 20 to 80% by weight of leuco vat dye, from 5 to 55% by weight of reductant and from 3 to 20% by weight of alkali metal hydroxide.

The leuco vat dyes employed can be both the leuco forms of anthraquinoid and the leuco forms of indigoid vat dyes.

Preferred examples of the vat dyes are C.I. Vat Green 9 and especially indigo and tetrabromoindigo (brilliant indigo).

Suitable reductants are in principle those reductants which are solid at room temperature and stable at the temperature prevailing during the production of the preparations according to the invention (even in the presence of alkali).

Both inorganic and organic reductants are suitable, such as are also suitable for vat dyeing. The reductants can be employed individually or in the form of mixtures.

Examples of preferred organic reductants which may be mentioned are especially $\alpha$-hydroxycarbonyl compounds, such as $\alpha$-hydroxyketones which can contain 4 to 6 carbon atoms, eg. acetoin, glutaroin and adipoin, sugars, both aldoses and ketoses, eg. glucose, mannose and fructose, and enediols stabilized by an $\alpha$-keto function, which can contain 4 to 8 carbon atoms, eg. reductic acid and ascorbic acid.

A preferred inorganic reductant which can be mentioned is especially hydrosulfite (sodium dithionite) which at the same time is also the preferred reductant for the leuco dye preparations according to the invention.

Reductants which are furthermore suitable are also organic iron(II) complex salts, in particular those with aliphatic hydroxy compounds, such as are disclosed in DE-A-43 20 867.

Suitable alkali metal hydroxides are in particular potassium hydroxide and especially sodium hydroxide. Of course, mixtures of alkali metal hydroxides can also be employed.

The leuco vat dye is converted by means of the hydroxide to the readily soluble alkali metal salts. Leucoindigo forms, for example, the mono- and/or the di-salt depending on the amount of alkali metal hydroxide.

The molar ratio of leuco vat dye and alkali metal hydroxide is therefore expediently from about 1:1 to 1:10, preferably 1:1 up to the molar ratio necessary for the conversion of all free hydroxyl groups contained to the salt form.

In general, amounts of reductant which are distinctly below 50% by weight, based on the leuco vat dye, are sufficient for the stabilization of the leuco vat dye during storage of the granule preparation (protection from reoxidation). If, however, an amount of reductant in the above range of the weight ratio mentioned above for the preparations according to the invention (about 40 to 55% by weight) is selected, ie., based on the leuco vat dye, up to about 65% by weight, the reoxidized amount of vat dye inevitably formed as a result of air contact during the dyeing process can additionally be directly balanced, and no further reductant then has to be added to the dye bath. This amount of reductant can be adjusted by slight variation of the dyeing range used in each case.

Thus, eg. in the case of the leucoindigo preparations of particular interest, the amount of the preferred reductant hydrosulfite necessary for stabilization is as a rule from 5 to 30% by weight, in particular from 10 to 20% by weight, based on leucoindigo, corresponding to a preparation having a preferred composition of from 55 to 75% by weight leucoindigo, from 10 to 20% by weight of hydrosulfite and from 10 to 20% by weight of alkali metal hydroxide, while for the simultaneous compensation of the loss as a result of reoxidation during dyeing, amounts from 20 to 55% by weight, especially 25 to 35% by weight, of hydrosulfite, based on leucoindigo are to be recommended, corresponding to a preparation having a preferred composition of from 40 to 60% by weight of leucoindigo, 30 to 40% by weight of hydrosulfite and 8 to 15% by weight of alkali metal hydroxide.

The dyer thus no longer has to have any additional reductant at hand. This is of particular interest for the reductant hydrosulfite which is customary in vat dyeing, as hydrosulfite present as a pure substance, ie. not as a mixture having a content of <50% by weight, is to be classified as a hazardous substance according to the current safety procedures because of its tendency for self-ignition and is therefore problematic during handling and storage.

Using the leuco vat dye preparations according to the invention, not only were readily meterable, storage-stable (stability on several weeks storage at 50° C. with admission of air) dye preparations developed which polluted the dyeing effluent distinctly less in comparison with the use of the unreduced vat dye and were rapidly soluble in the dye bath, a way was simultaneously also found to convert hydrosulfite into a safe form suitable for dyeing.

Essential for the stabilization of the leuco vat dye against reoxidation is its permanent even mixing with the reductant, which is guaranteed by the granule form according to the invention (as a rule mainly spherical particles having a mean particle size from in general 0.1 to 2 mm, preferably 0.5 to 1.5 mm, are present).

The amount of reductant, which exceeds the amount necessary for stabilization and is only used for compensating the reoxidation during dyeing, can also be subsequently admixed as a solid to the granules which are already adequately stabilized by reductant, it also being possible to use a reductant which is different from that contained in the granules. These mixtures can be adapted to the requirements of the particular dyeing range in a particularly simple manner.

In the production of the leucoindigo preparations according to the invention, the aqueous solution obtained during the preparation of leucoindigo or its derivatives by catalytic hydrogenation can advantageously be employed directly for drying after removal of the catalyst.

The catalytic hydrogenation itself can in this case be carried out as generally known, for example by reduction of an alkaline indigo paste (customarily from 10 to 35% by weight of indigo, 2 to 10% by weight of alkali metal hydroxide) using Raney nickel as a catalyst at a hydrogen pressure of in general from 2 to 10 bar and a temperature of, as a rule, from 60° to 90° C.

The leucoindigo solutions obtained as a rule contain from 10 to 35, preferably from 15 to 30 and particularly preferably from 20 to 25% by weight of leucoindigo.

In a similar manner, starting solutions of the leuco vat dyes suitable for drying can also be obtained in the case of anthraquinoid vat dyes.

In the preparation process according to the invention, the alkaline leuco vat dye solutions together with a solution or suspension of the selected reductant in water and/or a water-miscible solvent are employed with exclusion of oxygen, advantageously after inertization with a protective gas such as nitrogen, and concentrated to dryness with thorough mixing.

In the case of hydrosulfite, eg. from about 5 to 25, preferably 10 to 15, % strength by weight aqueous solutions are recommended for this purpose.

The leuco vat dye solution and the reductant solution (or suspension) can be mixed before or during the drying process, but the reductant can also be added directly to the leuco vat dye solution as a solid.

The product temperature necessary for drying depends on whether the process is carried out under reduced pressure or not and is customarily from 70° to 90° C. or from 105° to 130° C.

During the drying process thorough mixing of the liquid phase and the solid obtained must be guaranteed.

Apparatuses suitable for the large scale are therefore eg. tumble-dryers, paddle dryers and mechanically cleaned contact dryers, in which drying is preferably performed under reduced pressure (from about 10 to 500 mbar). As a rule, it is recommended to add an afterdrying time of from about 1 to 2 h at the drying temperature selected in each case to the actual drying. If appropriate, an additional coarse pulverization can be performed in or outside the drying apparatus.

The process according to the invention can advantageously also be carried out in a spray drying plant such as a spray tower and particularly a spray fluidized bed in which the water is evaporated by the introduction of hot inert gas, preferably nitrogen. The dried product can here be obtained directly in the desired particle size.

It is recommended to cool the dried product to a temperature of, as a rule, <50° C. before removing it in order to avoid a reoxidation in the hot state.

With the aid of the process according to the invention, the new leuco vat dye preparations can be prepared continuously in granule form in a simple manner. In general, the dried products contain only a small amount (about <4% by weight) of unreduced vat dye.

The leuco vat dye preparations according to the invention are advantageously suitable for dyeing cellulose-containing textile material. The dyeings obtained completely meet the requirements. The effluent pollution with sulfate is drastically reduced in comparison with the use of unreduced dyes. Depending on the composition of the leuco vat dye preparation selected, the dyeing can also be carried out without further addition of reductant to the dye bath.

EXAMPLES

A) Preparation of leucoindigo preparations according to the invention

Example 1

A solution of 13% by weight of leucoindigo (calc. as the free acid), 6% by weight of sodium hydroxide, 4% by weight of hydrosulfite (88% strength) and 77% by weight of water was slowly introduced at 10 mbar into a rotary evaporator inertized with nitrogen and heated to an oil bath temperature of 140° C., and concentrated to dryness at a speed of rotation of 70 rpm. After an afterdrying time of 2 h at the indicated oil bath temperature of 140° C., the mixture was cooled to <40° C.

After a coarse pulverization, the granules had a mean particle diameter of 1 mm. By extraction with water in a Soxhlet, an amount which was water-insoluble (by-products and unreduced indigo) of <1% by weight was determined. Its composition was ≈57% by weight of leucoindigo, 17% by weight of hydrosulfite and 26% by weight of sodium hydroxide.

Example 2

A solution of 13% by weight of leucoindigo (calc. as the free acid), 6% by weight of sodium hydroxide, 4% by weight of hydrosulfite and 77% by weight of water was continuously spray granulated in a fluidized bed inertized with nitrogen at a fluidizing gas velocity of 1.2 m/sec. The feed gas temperature was 130° C.; the waste gas temperature was 90° C. and corresponded to the product temperature in the fluidized bed. The granules formed were removed from the fluidized bed by means of a screw conveyor and transported to a storage container pneumatically using a stream of nitrogen for cooling to room temperature.

The granules of the useful fraction had a mean particle diameter of about 1 mm. The amount which was water-insoluble was <1% by weight. The composition of the granules corresponded to the composition of the granules from Example 1.

Example 3

Similarly to Example 1, a solution of 20% by weight of leucoindigo (calc. as free acid), 5% by weight of sodium hydroxide, 3.5% by weight of acetoin and 71.5% by weight of water was dried at an oil bath temperature of 120° C.

In the granules obtained after subsequent coarse comminution, having an average particle diameter of 1 mm, an amount which was water-insoluble of <1% by weight was determined.

Example 4

Similarly to Example 3, a solution of 23% by weight of leucoindigo (calc. as free acid), 5% by weight of sodium hydroxide, 2.3% by weight of acetoin and 69.7% by weight of water was dried.

The granules obtained in a similar manner contained an amount which was water-insoluble of < 1% by weight.

Example 5

Similarly to Example 3, a solution of 23% by weight of leucoindigo (calc. as free acid), 5% by weight of sodium hydroxide, 1.2% by weight of acetoin and 70.8% by weight of water was dried.

The granules obtained in a similar manner contained an amount which was water-insoluble of <1% by weight.

Example 6

Similarly to Example 3, a solution of 21.5% by weight of leucoindigo (calc. as free acid), 4.8% by weight of sodium hydroxide, 1.1% by weight of-glucose and 72.6% by weight of water was dried.

The granules obtained after coarse comminution had an average particle diameter of 0.8 mm and contained an amount which was water-insoluble of <1% by weight.

Example 7

1490 g of an aqueous solution containing 21.5% by weight of leucoindigo (320 g, calc. as free acid), 5% by weight (74 g) of sodium hydroxide and 32 g of molasses was concentrated to dryness in a Discotherm reactor at an oil bath temperature of 120° C. and a pressure of 30–50 mmHg. After distilling off the solvent, the granules were dried for a further 2 h at 120° C. and then cooled to room temperature while maintaining the vacuum.

The granules obtained contained an amount which was water-insoluble of <1% by weight.

Example 8

Similarly to Example 7, 510 g of an aqueous solution containing 23% by weight of leucoindigo (117 g, calc. as free acid), 5% by weight (25.5 g) of sodium hydroxide and 11.7 g of ascorbic acid were dried.

The granules obtained contained an amount which was water-insoluble of 1.6% by weight.

B) Dyeing with leucoindigo preparations according to the invention

Example 9

For dyeing, a customary indigo dyeing range was used having only one bath of 2000 l liquor volume, immersion four times and oxidation (4 passages). The yarn throughput of raw cotton yarn Nm 12 and 4000 threads was 600 kg/h. The fixed indigo content was 1.8%.

Under these production conditions (standard), the leucoindigo granules from Example 1 and, in a further dyeing experiment, the leucoindigo granules from Example 2 were allowed to trickle into the dye bath continuously at 23.5 kg/h during the experimental period of 8 h to maintain the stationary (constant) conditions already established.

By using these leucoindigo granules, it was possible to dispense with separate addition of reductant and/or base, which is necessary in the standard process.

The dyed yarn had the same shade, depth of color and fastness as a yarn dyed in a conventional manner with continuous addition of 65 kg/h of leucoindigo solution 20% strength (calc. as the free acid)

4 kg/h of hydrosulfite 88% strength 15 l/h of sodium hydroxide solution 38° Bé.

We claim:

1. A leuco indigo preparation in granule form, consisting essentially of leuco indigo or leuco forms of indigo derivatives, hydrosulfite and alkali metal hydroxide,
   wherein said leuco indgo preparation comprises about <4% by weight of unreduced indigo wherein said granules are mainly spherical particles having a mean particle size from 0.1 to 2 mm.

2. A preparation as claimed in claim 1, which comprises from 20 to 80% by weight of leucoindigo, from 5 to 55% by weight of hydrosulfite and from 3 to 20% by weight of alkali metal hydroxide.

3. A process for preparing leucoindigo preparations as claimed in claim 1, which comprises concentrating to dryness an aqueous alkaline solution of leucoindigo or the leuco form of an indigo derivative and a solution or suspension of hydrosulfite in water, a water-miscible solvent or a mixture thereof together with thorough mixing and with exclusion of oxygen.

4. A process as claimed in claim 3, which is carried out under inert gas atmosphere, reduced pressure or a mixture thereof.

5. A process as claimed in claim 3, wherein the leucoindigo solution and the solution or suspension of hydrosulfite are first mixed or hydrosulfite is introduced into the leucoindigo solution as solid and the mixture is then subjected to drying.

6. A process as claimed in claim 3, which is carried out in a spray drying plant.

7. A process for dyeing cellulose-containing textile material, which comprises using for this leucoindigo preparations as claimed in claim 1.

8. A method of stabilizing dry hydrosulfite against self-ignition, which comprises spray granulating an aqueous hydrosulfite solution together with a leucoindigo solution with exclusion of oxygen in such a weight ration that the resulting granules comprises hydrosulfite in an amount <50% by weight of hydrosulfite.

9. The leuco indigo preparation of claim 1, wherein said granule form has a mean particle size of from 0.5 to 1.5 mm.

10. The leuco indigo preparation of claim 1, wherein said alkali metal hydroxide is selected from the group consisting of potassium hydroxide, sodium hydroxide and a mixture thereof.

11. The leuco indigo preparation of claim 1, wherein a molar ratio of said leuco-vat dye and alkali metal hydroxide is from 1:1 to 1:10.

* * * * *